(No Model.)
E. GARTLAND.
CHART FOR DRAFTING GARMENTS.
No. 355,160. Patented Dec. 28, 1886.
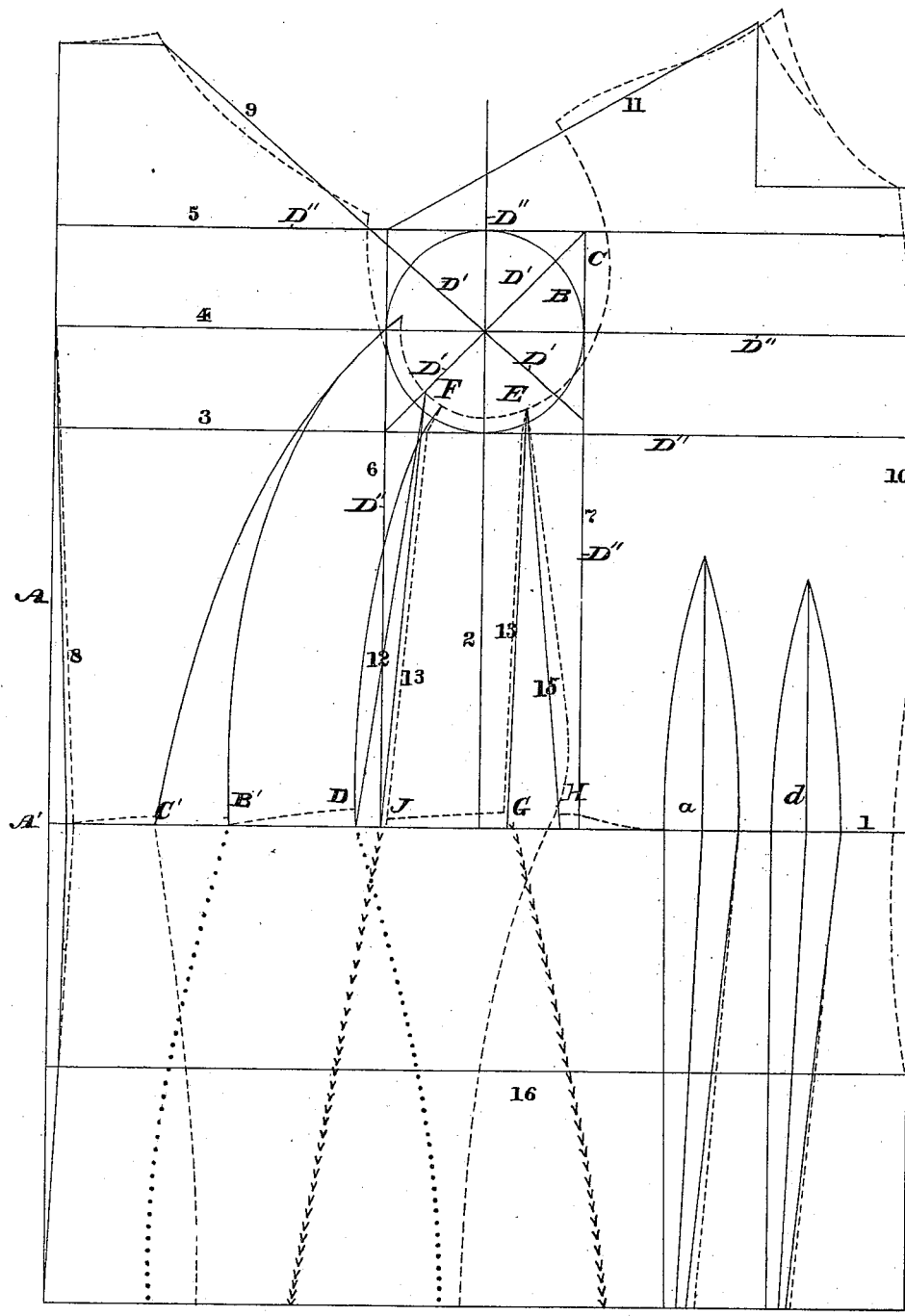
WITNESSES:
A. F. Grant
W. F. Kircher
INVENTOR:
Elizabeth Gartland
BY John A. Wiedersheim
ATTORNEY.

UNITED STATES PATENT OFFICE.

ELIZABETH GARTLAND, OF PHILADELPHIA, PENNSYLVANIA.

CHART FOR DRAFTING GARMENTS.

SPECIFICATION forming part of Letters Patent No. 355,160, dated December 28, 1886.

Application filed February 4, 1886. Serial No. 190,793. (No model.)

*To all whom it may concern:*

Be it known that I, ELIZABETH GARTLAND, a citizen of the United States, residing in the city and county of Philadelphia, State of Pennsylvania, have invented a new and useful Improvement in Drafting Charts for Patterns of Garments, which improvement is fully set forth in the following specification and accompanying drawing, in which the figure shown represents a chart with drafted pattern in dotted lines.

The method of constructing the chart is as follows: All measurements of the body are taken with the arm-hole as the center or basis. Ten inches from the lower edge of the sheet A of paper on which the pattern is to be drafted draw line 1 the entire length of the square for waist-line. On line 2, drawn vertically from the center of line 1, make a dot at a distance above the waist-line corresponding to the under-arm measure, and draw the line 3 parallel to line 1, said line 3 being designed for bust-measure. With its center on line 2 draw the circle B, according to arms-eye, measure, resting on line 3. Through the center of the circle draw line 4 parallel to line 3, the portion of said line 4 to the left of the circle being for width of back, and the portion to the right of the circle for the width of chest. Parallel to line 4 and tangent to the circle draw line 5, the shoulder-line ending thereon. The lines 6 and 7, which are parallel to line 2 and tangent to the circle, divide the back of the body from the front thereof.

The lines D' or slanting diameters of the circle are drawn at angles to the vertical line 2, one of said lines being at an angle of forty-five degrees thereto and the other at a little greater inclination, as shown in the figure, and are for the following uses: The end of the upper right-hand line where it touches line 5 is the lower end of the shoulder-line. The end of the lower left-hand line where it touches line 3 determines the front seam of sleeve. The end of the upper left-hand line marks where fullness at top of back shoulder begins.

From line 1 draw line 8 to point of width of back on line 4, extending the said line 8 the exact length of back-measure. From a point one-half inch to the right of line 8 and on waist-line draw a line to the junction of lines 4 and 8, and from the upper end of extension of line 8 or back-measure draw a line to the right of line 8 for back of neck, which line is in length always one-sixth of neck-measure. From the end of the line just drawn draw a slanting line, 9, which will pass near the junction of lines 5 and 6, and connected with the diameter of the circle, which line 9 is the back shoulder-line. Now, dot for shoulder-measure and curve down to line 4, mark off on line 3 from line 8 the bust-measure, and draw line 10 parallel to line 2, said line 10 being for front line of waist. Now, draw a line one-quarter of length of neck-measure from the left of the upper point of line 10, then draw a line of same length perpendicular thereto, and from the upper end of this last-drawn line draw line 11 (which is the front shoulder-line) to the junction of lines 5 and 6. Extend line 11 one-half inch to the right and slope to front neck. At half the distance between dot A', used for slope of back, and line 6 make dot B' for back of side body, and one and three-quarter inch to right of A' make dot C', and one-half inch to left of line 6 make dot D. Dot C' is for front of back, and D for front of side body. The dot E at junction of inside curve of circle and lower right end of diameter marks the top of front of side body and under-arm gore.

Line 12 is employed to find the front line of side body, and is obtained by drawing from dot D to dot F on curved line of arm-hole at intersection of slanting diameter. Line 13, for front line of under-arm gore, is drawn from dot E, on inside of curved line, three-quarter inch to right of line 2, down to dot G, which is the lower front of under-arm gore and on waist-line.

From a little to the left of dot F draw line 14, for back of under-arm gore. The said dot F is three-fourths of an inch to left of line 2, and is at the same height with the top of the front of the under-arm gore down to waist-line.

Line 15, which is used to find back line of front body, is drawn from dot E to dot H, and line 16, which is for hip-measure, is drawn parallel to line 1 below the same.

Dots G, H, and I are on waist-line, the first marking the lower front of under-arm gore, the second the back of front body, and the third the lower back of under-arm gore. Draw the curve for side body by placing the inside of curvature at dot B' on waist-line and let it touch back-line above line 3, and extend line into circle one-half inch, curve the line for arm from end of extended line around to touch line 4 on opposite side.

The curve for waist-line is made by beginning at the back-dart and sloping up one-half inch above line 1 toward line 3 and down again to back.

For darts, divide the space on waist-line 1 between lines 7 and 10 into three parts by lines $a$ and $a'$, leaving about three inches between said lines. From points three-quarters of an inch from said lines on both sides and on waist-line draw curved lines to the top of darts, the rear dart being one-half inch higher than the front one.

The shortest part of shoulder is formed by placing point of square at top of perpendicular line of side neck and top of circle, make a mark at shoulder-measure, then curve from shoulder-line down to left of circle on line 4. Curve the fronts from dot E to H, and under-arm gore from dot E to G and F to J. Slope back-line from dot A' to bottom of line 8. The pattern outlines having been marked on the chart, as stated, they can be readily transferred by means of a tracing-wheel to paper, so that the material may be cut thereby and a perfect fit secured in accordance with the body measurements.

Having thus described my invention, what I claim as new, and desire to secure by Letters Patent, is—

1. The system herein described of making a chart for patterns of garments, consisting in plotting thereon by means of a circle whose circumference is the proper arm-measurement of the garment to be patterned, and a waist-line distant from said circle the proper under-arm measurement, slanting diameters of said circle drawn at angles, substantially as described, and other lines connected with said circle, waist-line, and slanting diameters, all of the various body measurements, as set forth.

2. An improved chart for making patterns of garments, consisting of a chart having thereon as the basis for drawing the outlines a circle whose circumference is the proper arm-measure of the garment to be patterned, and a waist-line distant from the circle the proper under-arm measurement, and a series of slanting diameters, as described, and lines of the lengths of the various body measurements, all substantially as described.

3. A chart for drafting the outlines of patterns having thereon a circle with slanting diameters, substantially as described and shown, and lines tangential to said circle, and other lines parallel to said tangential lines, said circle having a circumference equal to the proper arm-measurement of the garment to be patterned, all substantially as and for the purpose set forth.

ELIZABETH GARTLAND.

Witnesses:
JOHN A. WIEDERSHEIM,
A. P. GRANT.